United States Patent

Gill et al.

[11] Patent Number: 6,163,442
[45] Date of Patent: Dec. 19, 2000

[54] HIGH MOMENT BILAYER FIRST POLE PIECE LAYER OF A WRITE HEAD WITH HIGH MAGNETIC STABILITY FOR PROMOTING READ SIGNAL SYMMETRY OF A READ HEAD

[75] Inventors: Hardayal Singh Gill, Portola Valley; Edward HinPong Lee; Michael Salo, both of San Jose; Joseph Francis Smyth, Los Altos; John David Westwood, San Jose; Samuel Wonder Yuan, San Carlos, all of Calif.

[73] Assignee: International Business Machines Corporation, Armonk, N.Y.

[21] Appl. No.: 09/268,551

[22] Filed: Mar. 15, 1999

[51] Int. Cl.[7] .................................. G11B 5/127; G11B 5/33
[52] U.S. Cl. ........................................... 360/317; 360/126
[58] Field of Search ................................... 369/317, 126, 369/113; 360/317, 126

[56] References Cited

U.S. PATENT DOCUMENTS

| | | | |
|---|---|---|---|
| 5,264,981 | 11/1993 | Campbell et al. | 360/126 |
| 5,515,221 | 5/1996 | Gill et al. | 360/319 |
| 5,639,509 | 6/1997 | Schemmel | 427/130 |
| 5,751,526 | 5/1998 | Schemmel | 360/317 |
| 5,774,308 | 6/1998 | Ohtsuka et al. | 360/126 |
| 5,926,350 | 7/1999 | Chiu et al. | 360/121 |
| 5,973,891 | 10/1999 | Neumann | 360/126 |
| 5,995,342 | 11/1999 | Cohen et al. | 360/126 |

*Primary Examiner*—William Klimowicz
*Assistant Examiner*—Julie Anne Watko
*Attorney, Agent, or Firm*—Gray Cary Ware & Freidenrich LLP; Ervin F. Johnston

[57] ABSTRACT

A high moment bilayer first pole piece layer of a write head has high magnetic stability for promoting read signal symmetry of a read sensor of a read head. The bilayer first pole piece layer has a first layer of nickel iron and a second layer of iron nitride. The iron nitride has a high magnetic moment for conducting more flux per volume than the nickel iron first layer. In a first aspect of the invention, the nickel iron first layer is highly stabilized by providing it with a negative magnetostriction so that a stress induced anisotropy ($H_K$) supports an intrinsic uniaxial anisotropy ($H_K$) of the nickel iron first layer. The iron nitride second layer is formed directly on the nickel iron first layer so that by magnetic coupling the iron nitride second layer has significantly improved magnetic stability. In a second aspect of the invention the iron nitride second layer is provided with a positive magnetostriction which still further increases the magnetic stability of the bilayer first pole piece layer. In a preferred embodiment a net magnetostriction is zero or near zero. Each aspect of the invention improves the asymmetry sigma of the read head.

20 Claims, 10 Drawing Sheets

HIGH MOMENT BILAYER FIRST POLE PIECE LAYER OF A WRITE HEAD WITH HIGH MAGNETIC STABILITY FOR PROMOTING READ SIGNAL SYMMETRY OF A READ HEAD

BACKGROUND OF THE INVENTION

1. Field of the Invention

The present invention relates to a high moment bilayer first pole piece layer of a write head with high magnetic stability for promoting read signal symmetry of a read head and, more particularly, wherein a magnetic moment of the first pole piece layer returns to the same orientation after being subjected to multiple instances of a write current field.

2. Description of the Related Art

The heart of a computer is an assembly that is referred to as a magnetic disk drive. The magnetic disk drive includes a rotating magnetic disk, write and read heads that are suspended by a suspension arm above the rotating disk and an actuator that swings the suspension arm to place the read and write heads over selected circular tracks on the rotating disk. The read and write heads are directly mounted on a slider that has an air bearing surface (ABS). The suspension arm biases the slider into contact with the surface of the disk when the disk is not rotating but, when the disk rotates, air is swirled by the rotating disk adjacent the ABS of the slider causing the slider to ride on an air bearing a slight distance from the surface of the rotating disk. When the slider rides on the air bearing the write and read heads are employed for writing magnetic bits to and reading magnetic bits from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a nonmagnetic gap layer at an air bearing surface (ABS) of the write head. The pole piece layers are connected at a back gap. Current conducted to the coil layer induces a magnetic field into the pole pieces that fringes across the gap between the pole pieces at the ABS. The fringe field or the lack thereof writes information in tracks on moving media, such as in circular tracks on a rotating disk.

It should be understood that the second pole piece is made of a magnetic material. A magnetic moment of the first pole piece layer should be oriented along an easy axis parallel to the ABS and perpendicular to the direction of movement of the track on the rotating disk when the first pole piece is in a quiescent state, namely without a write current field from the write coil. When the magnetic moment does not return to an orientation parallel to the ABS after being subjected to multiple instances of the write current field, the first pole piece is not stable and this will affect the operation of the read head, which will be discussed in more detail hereinafter. A factor bearing upon the magnetic stability of the first pole piece and the return of its magnetic moment to an orientation parallel to the ABS is the uniaxial anisotropy $(H_K)$ of the first pole piece. The uniaxial anisotropy $(H_K)$ is a measure of the amount of applied magnetic field required to rotate the magnetic moment of the first pole piece from the orientation parallel to the ABS to an orientation perpendicular to the ABS. If the uniaxial anisotropy is too low the magnetic moment may not always return parallel to the ABS, which will impact the operation of the read head. However, if the uniaxial anisotropy is too high, rotation of the magnetic moment will be stiff in response to the write current field which will degrade the flux carrying capability of the first pole piece. Accordingly, the uniaxial anisotropy should be not too low or too high.

A material typically used for the first pole piece is nickel iron ($Ni_{80}Fe_{20}$) since nickel iron is a soft magnetic material. Nickel iron also has a high magnetic moment or magnetization for conducting flux to the ABS. The more flux conducted the greater the strength of the magnetic bits of information impressed into the rotating magnetic disk. Accordingly, when the write signal is increased the track width of the pole tip of the second pole piece can be reduced for increasing the storage capability of the disk drive. A material with a higher magnetic moment than nickel iron is iron nitride (FeN). Iron nitride will conduct more flux and thereby permit the track width of the pole tip of the second pole piece to be narrower. Unfortunately, while the iron nitride has a high magnetic moment, it does not have good magnetic stability. This means that the magnetic moment will not return to the parallel position to the ABS after being subjected to multiple instances of the write current field.

The read head includes a read sensor which is connected to first and second lead layers for conducting a sense current $(I_S)$ through the read sensor. The read sensor and the first and second lead layers are located between nonmagnetic electrically insulative first and second read gap layers and the first and second read gap layers are located between ferromagnetic first and second shield layers. In a merged magnetic head the second shield layer of the read head and the first pole piece layer of the write head are a common layer. In a piggyback type magnetic head the second shield layer and the first pole piece layer are separate layers and are insulated from one another by a nonmagnetic insulation layer. Magnetic instability of the first pole piece layer is more of a problem in the merged magnetic head since the first pole piece layer is closer to the read sensor and its magnetic instability more directly influences the magnetization of the read sensor.

The read sensor is typically an anisotropic magnetoresistive (AMR) read sensor or a giant magnetoresistive (GMR) read sensor which is also known as a spin valve sensor. Both sensors have a ferromagnetic layer with a magnetic moment that is oriented in a predetermined direction to the ABS in a quiescent state, namely when the read sensor is not reading a read signal. The AMR sensor employs a single ferromagnetic layer with its magnetic moment oriented typically 45° to the ABS. When the AMR read sensor is subjected to positive and negative going read signals from the rotating magnetic disk, the magnetic moment of the AMR read sensor rotates upwardly and downwardly respectively. This causes a change in the magnetoresistance of the sensor which is a function of $\sin^2\theta$, where $\theta$ is the angle between the direction of the magnetic moment of the ferromagnetic layer and the direction of the sense current. In the AMR sensor, when the angle $\theta$ between the orientation of the magnetic moment of the ferromagnetic layer is parallel to the sense current, the magnetoresistance is at a maximum and when the magnetic moment of the ferromagnetic layer is perpendicular to the sense current the magnetoresistance of the AMR sensor is at a minimum.

In the GMR sensor a nonmagnetic electrically conductive spacer layer is located between a ferromagnetic pinned layer and a ferromagnetic free layer. The pinned layer has its magnetic moment pinned perpendicular to the ABS by exchange coupling with an antiferromagnetic (AFM) layer. The magnetic moment of the free layer is oriented parallel to the ABS and its rotation upwardly or downwardly in response to positive or negative going signals from the rotating magnetic disk causes a change in the magnetoresistance of the GMR sensor. Magnetoresistance is a function of cos θ where θ is the angle between the orientation of the magnetic moment of the free layer and the orientation of the magnetic moment of the pinned layer. When these orientations are parallel with respect to one another the resistance is at a minimum and when these orientations are antiparallel the resistance is at a maximum.

When the magnetic moment of the first pole piece layer of the write head does not return to the same orientation parallel to the ABS after being subjected to a write current field this will influence the orientation of the magnetic moment of the ferromagnetic layer of the AMR sensor or the free layer of the GMR sensor from the 45° angle and the zero degree angle to the ABS to some other angle. This degrades the performance of the read head by increasing read signal asymmetry. The read head has symmetry when it produces equal positive and negative read signals in response to equal positive and negative signals from the rotating magnetic disk. If the magnetostatic coupling between the first pole piece layer and the read sensor causes the orientation of the magnetic moment of the read sensor to be at some positive angle, the read sensor will read an increased positive read signal in response to the read signal from the magnetic disk and a lower negative read signal in response to the negative read signal from the rotating disk. This is known in the art as positive read signal asymmetry. The opposite situation would be when the first pole piece layer influences the magnetic moment of the read sensor to be at a negative angle with respect to the ABS. In this condition the read sensor would have negative read signal asymmetry. Without influences from the write head a bias point is centered on a transfer curve of the read sensor where the transfer curve is a plot of the change in resistance of the read sensor in response to applied read signals from the rotating magnetic disk. When the read sensor has positive or negative read signal asymmetry the bias point is moved from a zero or middle position on the transfer curve to a location upwardly or downwardly on the transfer curve. A change in the direction of the magnetic moment of the first pole piece layer affects the bias point of the read sensor.

Accordingly, there is a strong-felt need to provide a first pole piece layer for a write head which has a high magnetic moment and yet is magnetically stable so that it does not cause read signal asymmetry of the read head.

SUMMARY OF THE INVENTION

The present invention is a bilayer first pole piece layer of a write head which has a first layer with a magnetic moment and a second layer that has a magnetic moment that is higher than the magnetic moment of the first layer, wherein the first layer is closer to the read sensor of the read head than the second layer. The lower moment first layer is nickel iron (NiFe) and the higher moment second layer is iron nitride (FeN). The invention constructs the nickel iron first layer with high magnetic stability for promoting magnetic stability of the iron nitride second layer by magnetic coupling therebetween, even though the iron nitride second layer, by itself, is generally magnetically unstable. With the invention the orientation of the magnetic moment of the first layer will always return to an orientation parallel to the ABS and, by exchange coupling with the second layer, its magnetic moment is likewise returned to an orientation parallel to the ABS when these layers are subjected to the write current field. In order to accomplish this aspect of the invention we have found that it is necessary that the volume of the iron nitride second layer be less than the volume of the nickel iron first layer. Further, steps need to be taken that the nickel iron first layer has good magnetic stability, which will be discussed next.

It should be understood that magnetic head assemblies are made in rows and columns on a wafer substrate. After completion, the wafer substrate is diced into rows of magnetic head assemblies after which they are lapped by a grinding process to form each magnetic head assembly with an air bearing surface. After lapping, the row of magnetic assemblies are diced into individual magnetic head assemblies for mounting on a suspension of the magnetic disk drive. When the nickel iron first layer is plated on the wafer substrate it is in tension in a direction parallel to the ABS and compression in a direction perpendicular to the ABS. However, after lapping, the nickel iron first layer is in compression parallel to the ABS and is in tension perpendicular to the ABS. Nickel iron has some elasticity so that when it is stretched by tension in a first direction it is compressed by compression in a direction normal to the first direction. After lapping, the uniaxial anisotropy ($H_K$) of the nickel iron first layer is not sufficient to ensure good magnetic stability.

We have taken advantage of the compression of the nickel iron first layer parallel to the ABS for increasing its uniaxial anisotropy and thereby improving its magnetic stability. This has been accomplished by constructing the nickel iron first layer with a negative magnetostriction. With the combination of compressive stress parallel to the ABS and negative magnetostriction the uniaxial anisotropy of the nickel iron first layer is increased by a stress induced uniaxial anisotropy. In a first aspect of the invention the nickel iron first layer is made highly stable by stress induced anisotropy so that a smaller iron nitride second layer has a high magnetic stability by magnetic coupling with the nickel iron first layer.

In a second aspect of the invention, the magnetic stability of the bilayer first pole piece layer is improved by making the sign of the magnetostriction of the iron nitride second layer opposite to the sign of the magnetostriction of the nickel iron first layer. Accordingly, since the nickel iron first layer has negative magnetostriction the iron nitride second layer is constructed with a positive magnetostriction. A sought for net magnetostriction of the first and second layers is zero or near zero. Examples in the description will demonstrate the improvement in magnetic stability by making the signs of the magnetostriction opposite with respect to one another.

An object of the present invention is to provide a high moment bilayer first pole piece layer of a write head which has high magnetic stability for promoting read signal symmetry of a read head.

Another object is to provide a bilayer first pole piece layer which has a nickel iron first layer with high magnetic stability and an iron nitride second layer that has high magnetic stability by magnetic coupling with the first layer.

A further object is to achieve the preceding object with an increased magnetic stability of the bilayer first pole piece layer by adjusting the magnetostrictions of the first and second layers.

Other objects and advantages of the invention will become apparent upon reading the following description taken together with the accompanying drawings.

DESCRIPTION OF THE PREFERRED EMBODIMENTS

Magnetic Disk Drive

Figure 1:
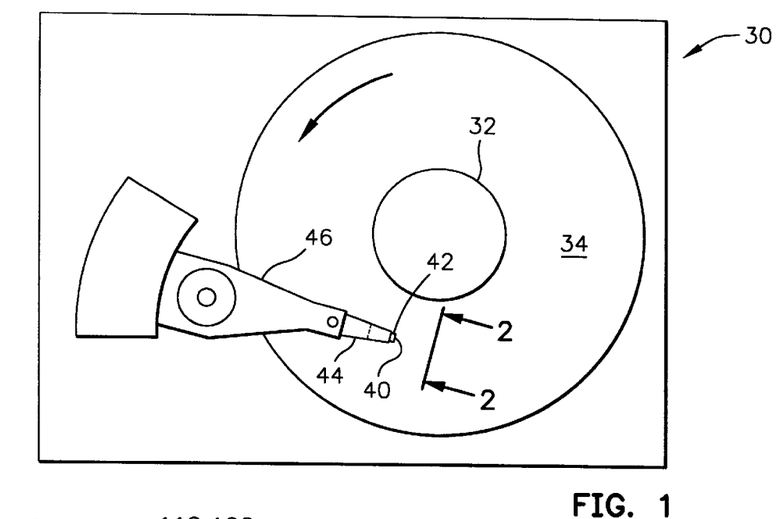
FIG. 1 is a plan view of an exemplary magnetic disk drive.
Figure 2:
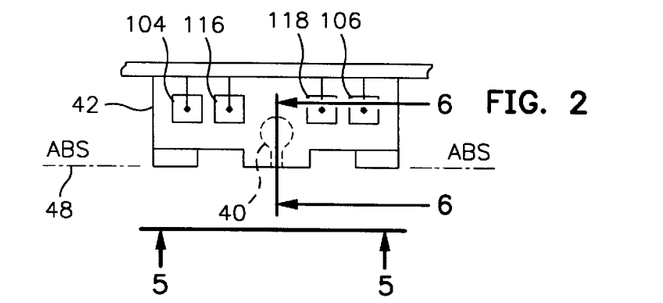
FIG. 2 is an end view of a slider with a magnetic head of the disk drive as seen in plane 2—2 of FIG. 1.
Figure 3:
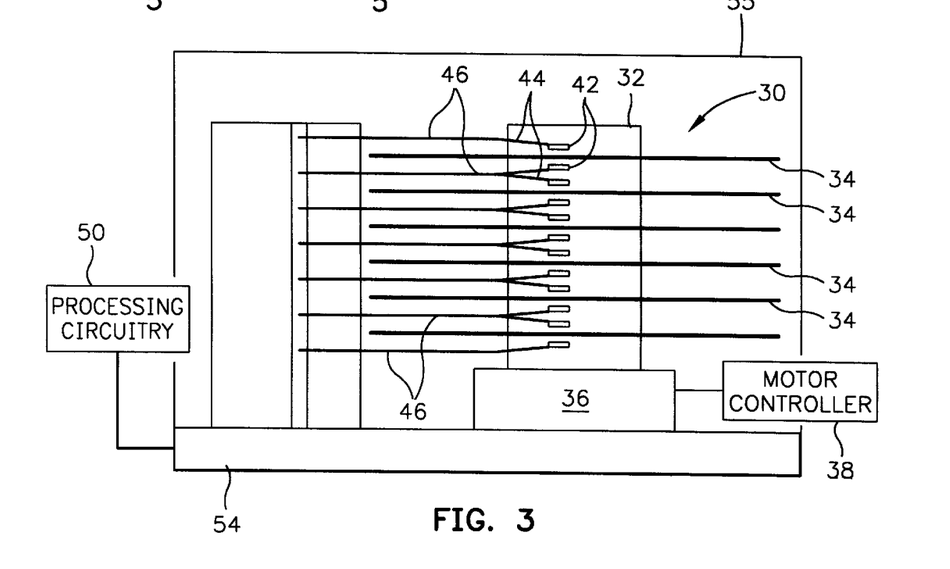
FIG. 3 is an elevation view of the magnetic disk drive wherein multiple disks and magnetic heads are employed.
Figure 4:
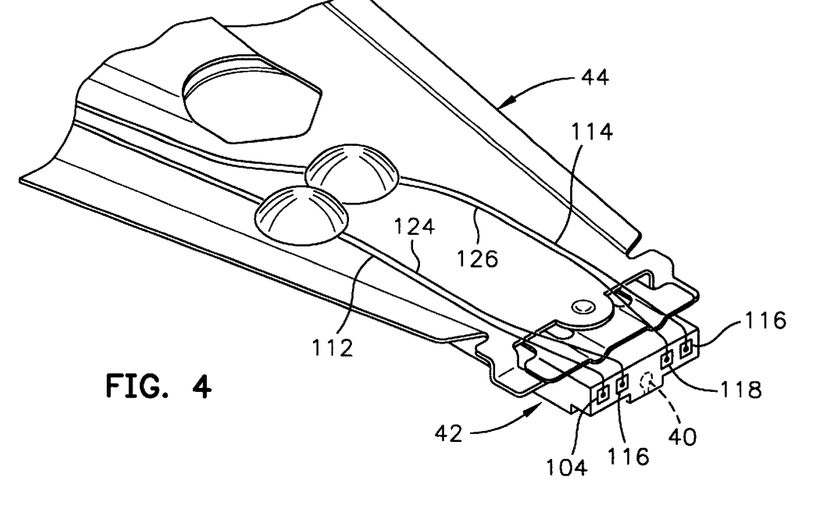
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a motor 36 that is controlled by a motor controller 38. A combined read and write magnetic head 40 is mounted on a slider 42 that is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 so that the magnetic head 40 is in a transducing relationship with a surface of the magnetic disk 34. When the disk 34 is rotated by the motor 36 the slider is supported on a thin (typically, 0.05 $\mu$m) cushion of air (air bearing) between the surface of the disk 34 and the air bearing surface (ABS) 48. The magnetic head 40 may then be employed for writing magnetic bits of information to multiple circular tracks on the surface of the disk 34, as well as for reading magnetic bits of information therefrom. Processing circuitry 50 exchanges signals, representing such information, with the head 40, provides motor drive signals for rotating the magnetic disk 34, and provides control signals for moving the slider to various tracks. In FIG. 4 the slider 42 is shown mounted to a suspension 44. The components described hereinabove may be mounted on a frame 54 of a housing, as shown in FIG. 3.

Figure 5:
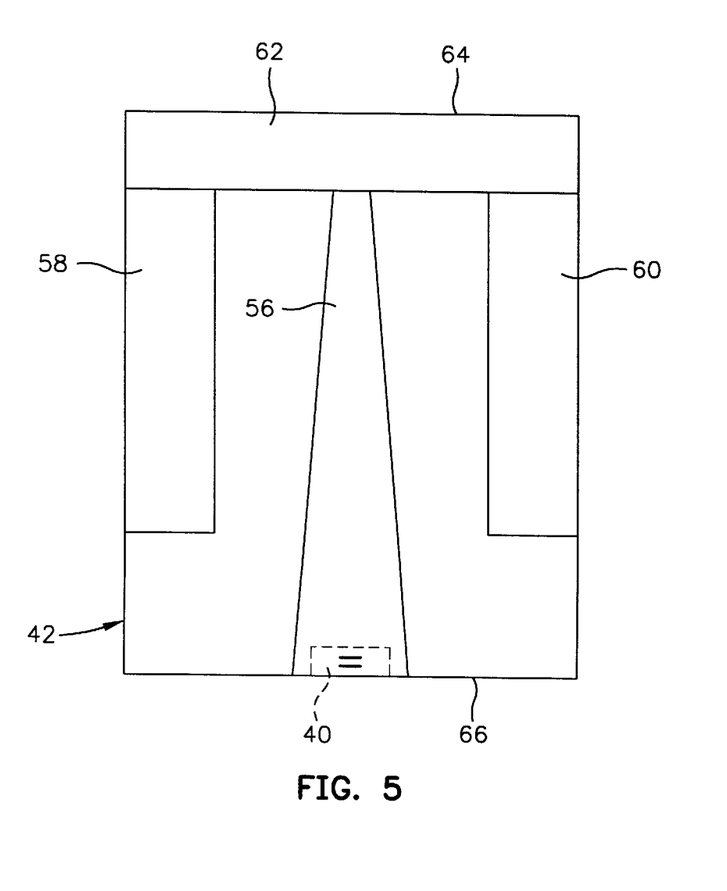
FIG. 5 is an ABS view of the slider and magnetic head taken along in plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figures 6, 7, 8:
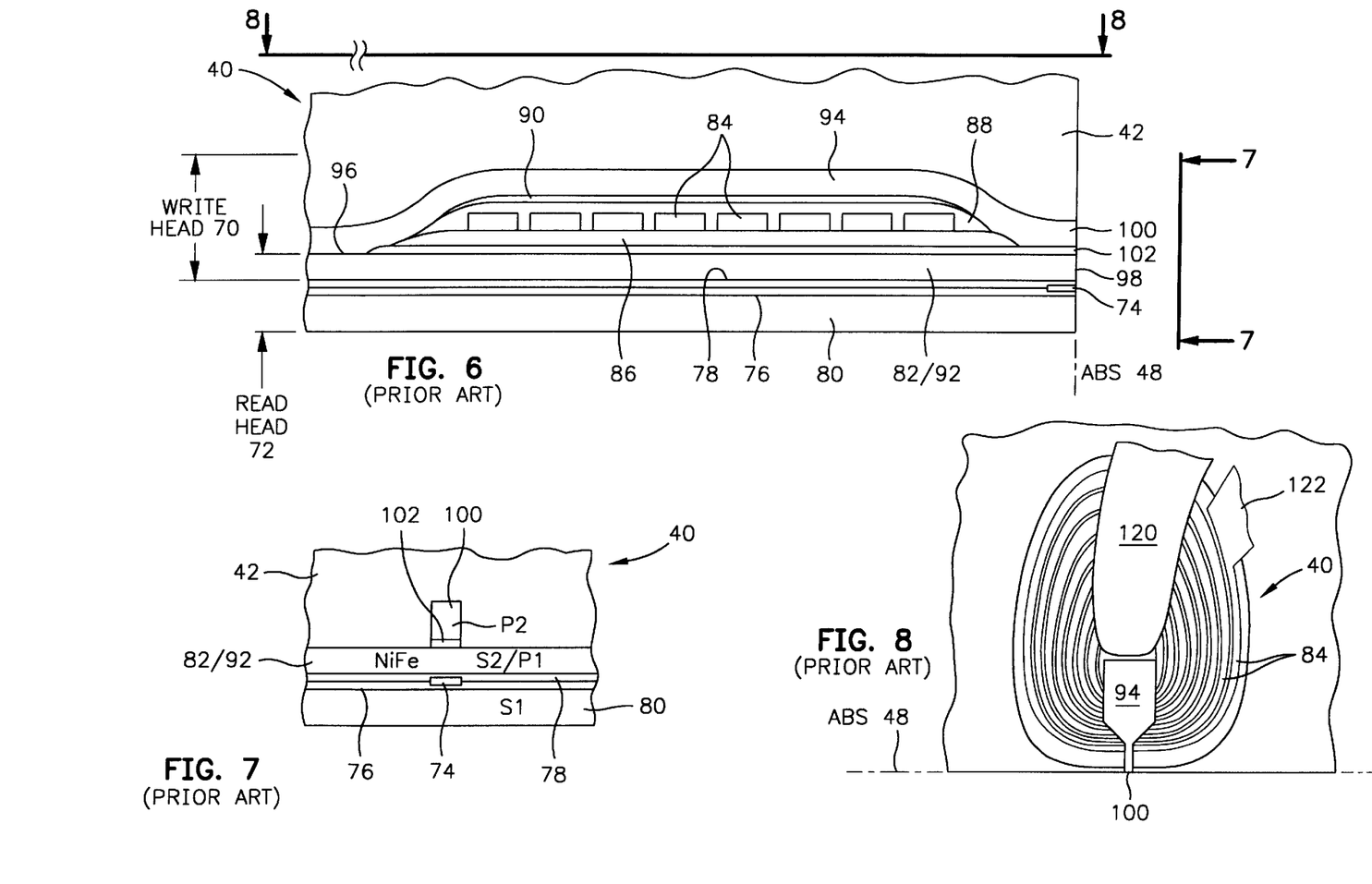
FIG. 6 is a partial view of a prior art slider and magnetic head as seen in plane 6—6 of FIG. 2.
FIG. 7 is a partial ABS view of the slider taken along plane 7—7 of FIG. 6 to show the read and write elements of the magnetic head.
FIG. 8 is a view taken along plane 8—8 of FIG. 6 with all material above the coil layer and leads removed.

FIG. 6 is a side cross-sectional elevation view of a prior art magnetic head 40, which includes a write head portion 70 and a read head portion 72, the read head portion employing a sensor 74. FIG. 7 is an ABS view of FIG. 6. The sensor 74 is sandwiched between first and second read gap layers 76 and 78, and the read gap layers are sandwiched between first and second shield layers 80 and 82. In response to external magnetic fields, the resistance of the sensor 74 changes. A sense current $I_S$ conducted through the sensor causes these resistance changes to be manifested as potential changes. These potential changes are then processed as readback signals by the processing circuitry 50 shown in FIG. 3.

The sensor may be an anisotropic magnetoresistive (AMR) sensor or a giant magnetoresistive (GMR) sensor which is also known as a spin valve sensor. In the AMR sensor and the GMR sensor, it is important that the orientation of the magnetic moment of one of its ferromagnetic layers be oriented parallel to the ABS and 45° to the ABS, respectively, so that applied read signals from the rotating magnetic disk rotate the magnetic moment up and down changing the magnetoresistance of the sensor as discussed hereinabove. It is important that the orientation not be skewed by some angle positive or negative by magnetic instability of the write head. When the magnetic moment of the ferromagnetic layer of the read sensor is at the required orientation the bias point of the read sensor is at the middle or zero point of the transfer curve of the read sensor. When the bias point is skewed positive or negative on the transfer curve the read sensor has positive or negative read signal asymmetry, respectively.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94.

The first and second pole piece layers 92 and 94 are magnetically coupled at a back gap 96 and have first and second pole tips 98 and 100 which are separated by a write gap layer 102 at the ABS. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

It is important that the second shield/first pole piece layer 82/92 have a high magnetic moment so that it has high flux conducting capability. A higher magnetic moment of the second shield/first pole piece layer equates to an increased write signal which, in turn, equates to a higher magnetic storage capability of the disk drive.

FIG. 7 is an ABS illustration of a prior art magnetic head assembly wherein the second shield/first pole piece layer 82/92 is nickel iron (NiFe). There is a strong-felt need for increasing the magnetic moment of the second shield/first pole piece layer 82/92 without causing magnetic instability which is discussed next.

THE INVENTION

Figure 9:
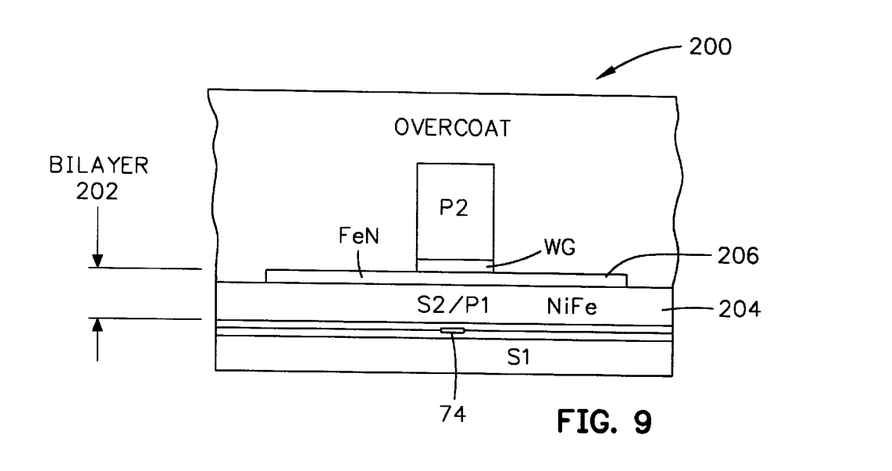
FIG. 9 is an ABS illustration of the present second shield/first pole piece bilayer (S2/P1) layer.

FIG. 9 is the present magnetic head assembly wherein the second shield/first pole piece layer (S2/P1) 202 is a bilayer. The bilayer second shield/first pole piece layer has a nickel iron (NiFe) first layer 204 and a second iron nitride (FeN) layer 206 wherein the nickel iron first layer 204 is closer to the read sensor 74 than the iron nitride second layer 206. While FIG. 9 illustrates a merged magnetic head, it should be understood that the invention can also apply to a piggyback type head wherein the second shield layer (S2) and the first pole piece layer (P1) are separate layers and are separated by a magnetic insulation layer (not shown). However, the merged magnetic head is more of a problem since the first pole piece layer is closer to the sensor 74 than the piggyback head and its magnetism will have a greater influence on the sensor 74.

After lapping the magnetic head assembly in FIG. 9 to form an air bearing surface the second shield/first pole piece layer 204 is under compressive stress parallel to the ABS. In a first aspect of the invention the second shield/first pole piece layer 204 is plated with a negative magnetostriction so that a combination of the compressive stress and the negative magnetostriction provides a stress induced uniaxial anisotropy ($H_K$) that supports its intrinsic uniaxial anisotropy parallel to the ABS. Without the stress induced uniaxial anisotropy the intrinsic uniaxial anisotropy is not sufficient to assure good magnetic stability. At this stage the intrinsic uniaxial anisotropy of the nickel iron first layer is too low to assure good magnetic stability. Accordingly, the stress induced uniaxial anisotropy supports the intrinsic uniaxial anisotropy to orient the easy axis parallel to the ABS with improved uniaxial anisotropy. The negative magnetostriction of the nickel iron first layer is assured during plating by controlling the ratio of nickel to iron in the plating bath. The magnetostriction becomes more negative as this ratio increases.

Figure 10:
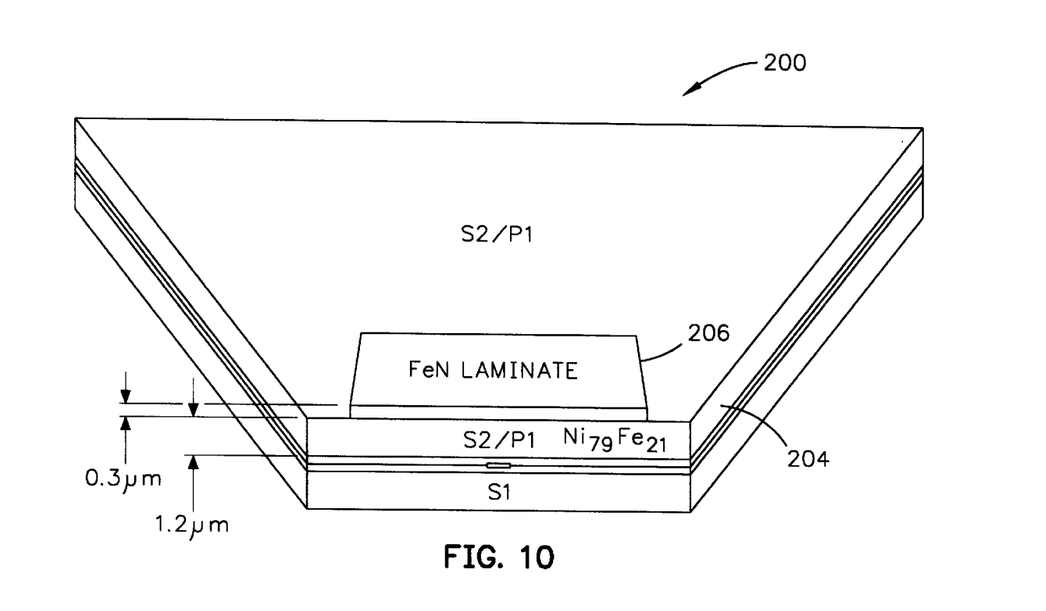
FIG. 10 is an isometric illustration of the second shield/first pole piece bilayer with the remainder of the read head therebelow.

The first aspect of the invention also provides the iron nitride second layer 206 with a smaller volume than the nickel iron first layer so that its magnetic moment will be oriented parallel to the ABS by magnetically coupling it with the nickel iron first layer 204. As shown in FIG. 10, the width, depth and thickness of the iron nitride second layer 206 may be less than the width, length and thickness of the nickel iron first layer 204. These dimensions provide the desired lower volume of the iron nitride second layer 206.

In a second aspect of the invention the iron nitride second layer 206 is provided with a positive magnetostriction which still further increases the magnetic stability of the bilayer 202. In a preferred embodiment the magnetostriction of the iron nitride second layer 206 is fashioned so that the bilayer 202 has a zero or near zero net magnetostriction. The combination of the first and second aspects of the invention assures magnetic stability of the bilayer 202 so that the operation of the read sensor 74 is not degraded. While the nickel iron first layer 204 provides magnetic stability for the iron nitride second layer 206, the iron nitride second layer 206 provides an improved magnetic moment so that the bilayer 202 conducts higher flux density for improving the strength of the write signal.

Figure 12:
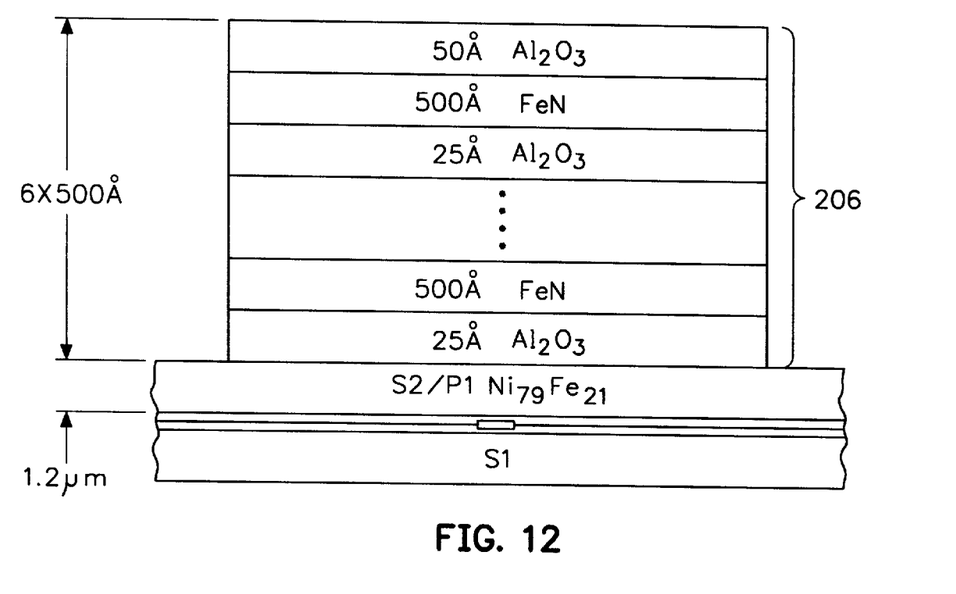
FIG. 12 is an exemplary ABS illustration of a second shield/first pole piece bilayer wherein the first layer is nickel iron and the second layer is a laminate of iron nitride with the thickness of the second layer made larger and out of proportion for description purposes.
Figure 13:
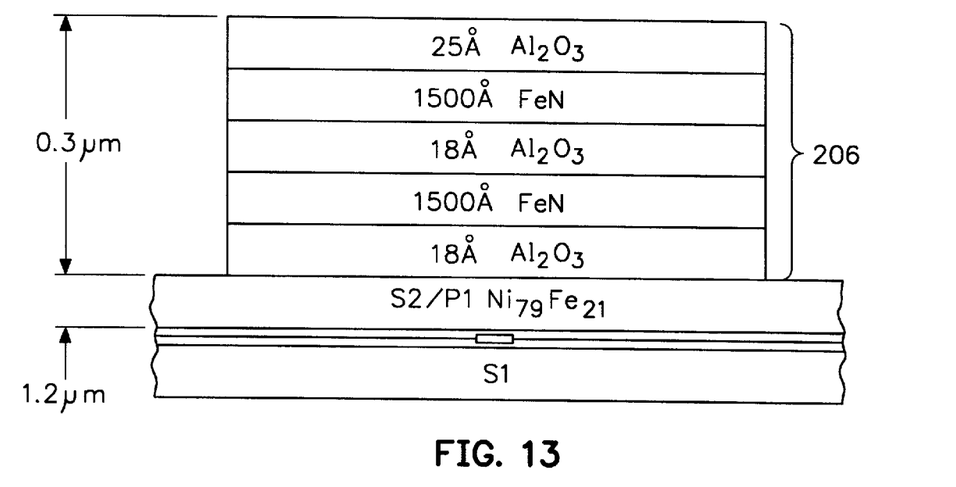
FIG. 13 is the same as FIG. 12 except another example of the second layer is illustrated.
Figure 14:
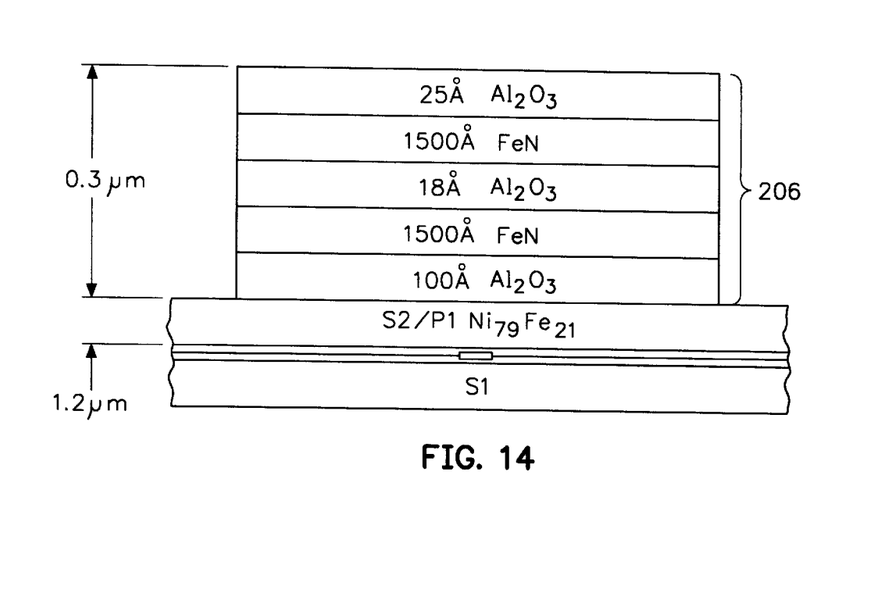
FIG. 14 is the same as FIG. 12 except a further example of the second layer is illustrated.

A third aspect of the present invention is that the second layer 206 is a laminate of iron nitride (FeN) and alumina ($Al_2O_3$) as shown in FIGS. 12–14. In the embodiment shown in FIG. 12, 25 Å of alumina and 500 Å of iron nitride is repeated six times with a top layer of 50 Å of alumina. This provides a magnetic thickness of 0.3 microns ($\mu$m). In a second embodiment of the second layer 206, shown in FIG. 13, the laminate includes 18 Å of alumina and 1500 Å of iron nitride repeated twice with a top layer of 25 Å of alumina. The magnetic thickness of this embodiment is the same as the embodiment in FIG. 12, namely 0.3 $\mu$m. A third embodiment of the second layer 206, shown in FIG. 14, is a laminate of 100 Å of alumina and 1500 Å of nitride repeated twice with a top layer of 25 Å of alumina. The magnetic thickness is still 0.3 $\mu$m. These embodiments will be explained in more detail in the examples hereinbelow.

EXAMPLE 1

Figure 11:
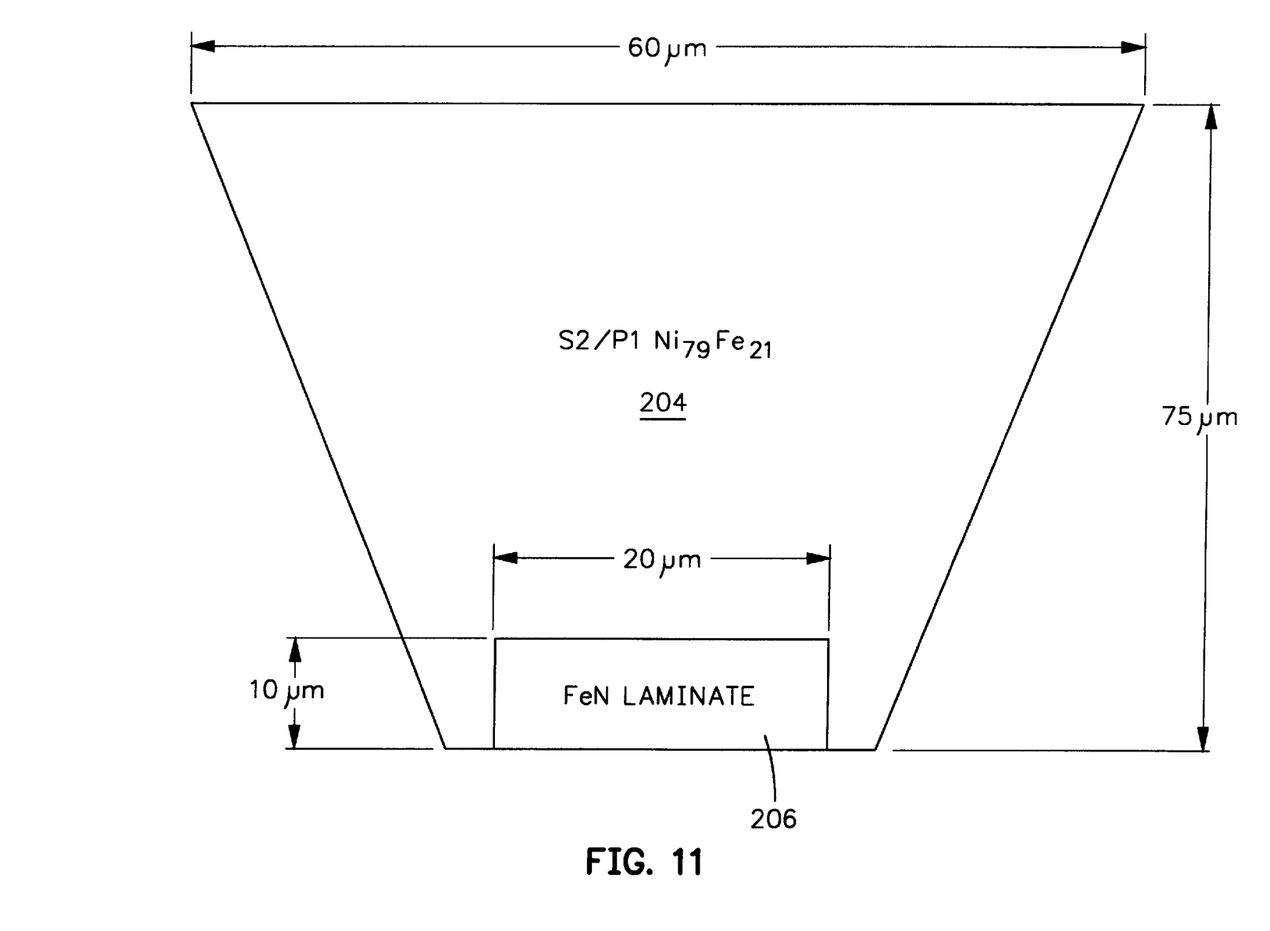
FIG. 11 is a top plan illustration of FIG. 10.

In this example the dimensions of the nickel iron first layer were shown in FIGS. 10 and 11 and the dimensions of the iron nitride laminate layer 206 was the same as shown in FIGS. 10 and 11, except the iron nitride laminate layer covered the full width and length of the nickel iron first layer 204 instead of a portion thereof, as shown in FIGS. 10 and 11. The magnetostriction lambda ($\lambda$) of the iron nitride laminate layer was +0.8×10$^{-6}$. The laminate structure of the iron nitride second layer 206 is shown in FIG. 13. A field of 50 oersteds (Oe) was applied to the shield layers numerous times and the write current and the sense current were turned on and off numerous times in order to determine the degree of asymmetry of the read signal of the read sensor 74. Asymmetry is characterized by the bias point on the transfer curve of the read sensor being positive or negative with respect to a zero bias point. More important is the average of the variation of the bias point from zero which is known in statistics as the standard direction or asymmetry sigma ($\sigma$). After subjecting the shields of the read head to the aforementioned fields numerous times the asymmetry $\sigma$ was 8.73%.

EXAMPLE 2

This example was the same as Example 1 except an iron nitride second layer 206 was patterned to the dimensions shown in FIGS. 10 and 11. The asymmetry sigma ($\sigma$) for the patterned iron nitride second layer 206 was 4.61%, which is a significant improvement over the first example with 8.73%.

EXAMPLE 3

The dimensions of the first and second layers 204 and 206 of the bilayer 202 in this example was the same as the dimensions set forth in Example 2. Further, the iron nitride laminate 206 was the same as the laminate in Examples 1 and 2 except the bottom layer was 100 Å of alumina in lieu of 18 Å of alumina as shown in FIG. 14. The magnetostriction of the laminate in this example was +2.7×10$^{-6}$. The asymmetry sigma ($\sigma$) was 6% which is an increase from Example 2. Accordingly, the higher magnetostriction of the laminate in this example resulted in an unfavorable increase in the asymmetry sigma (σ).

EXAMPLE 4

In this example the first and second layers 204 and 206 of the bilayer had the same dimensions as shown in FIGS. 10 and 11. The iron nitride laminate 206 was the same as that illustrated in FIG. 12. The iron nitride laminate had a magnetostriction of $+3\times10^{-6}$. The read gap, which is the total thickness of the first and second read gap layers 76 and 78, was 0.18 µm. The field applied to the shield layers was 50 Oe while the bias voltage for the sense current ($I_S$) was 270 millivolts (mV). The track width of the read sensor 74 was 1.1 µm. In this example the asymmetry sigma (σ) was 6.68% and the amplitude of the read signal was 799 microvolts (µV).

EXAMPLE 5

This example is the same as Example 4 except the magnetostriction of the iron nitride laminate 206 was $-3\times10^{-6}$. In this example the asymmetry stability sigma (σ) was 11.5% and the read signal amplitude was 946 µV. It can be seen from this example that a laminate with a negative magnetostriction results in an undesirable higher asymmetry sigma (σ).

Accordingly, the second aspect of this invention provides the iron nitride second layer 206 with a positive magnetostriction. A preferred embodiment is where the negative magnetostriction of the nickel iron first layer 204 and the positive magnetostriction of the second iron nitride layer results in a net magnetostriction of zero or near zero. The iron nitride is made with a positive magnetostriction by adjusting the amount of nitrogen in a chamber when iron nitride is sputter deposited on the wafer substrate.

Methods of Making

Figure 15:
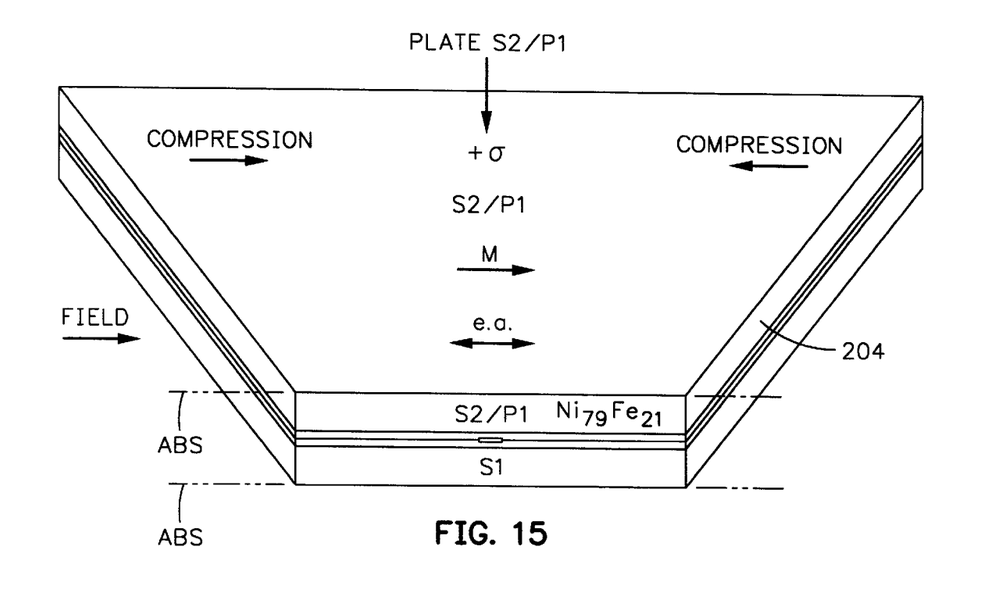
FIG. 15 is an isometric illustration of a first step in forming the first layer of the bilayer first pole piece layer.

A first method of making the present invention is illustrated in FIGS. 15–18. A first step in the construction of a bilayer 202 is to plate the nickel iron first layer 204 with dimensions as shown in FIGS. 10 and 11. The plating is done in the presence of a field which is parallel to the ABS and parallel to the top and bottom planes of the first layer 204 so that the easy axis (e.a.) of the first layer is oriented in the same direction. With the field going left to right, as shown in FIG. 15, the magnetic moment of the nickel iron first layer 204 will be from left to right. When positive and negative write current fields are imposed on the first layer 204, the magnetic moment rotates toward and away from the ABS respectively. It is important that the magnetic moment of the first layer return to its parallel position, as shown in FIG. 15, after it is subjected to multiple instances of write current fields. After lapping the aforementioned row of magnetic head assemblies to form the ABS the nickel iron first layer 204 is in compression in a direction parallel to the ABS and parallel to the top and bottom planes of the first layer. Accordingly, if the magnetostriction of the nickel iron first layer 204 is made negative, this will increase the uniaxial anisotropy ($H_K$) so that the magnetic moment (M) has increased stiffness in rotating from the parallel position shown in FIG. 15. The increased uniaxial anisotropy ($H_K$) increases the magnetic stability of the nickel iron first layer 204. $Ni_{80}Fe_{20}$ has substantially zero magnetostriction. By decreasing the iron content, such as from 20% to 18.5%, $Ni_{81.5}Fe_{18.5}$ will have a negative magnetostriction.

Figure 16:
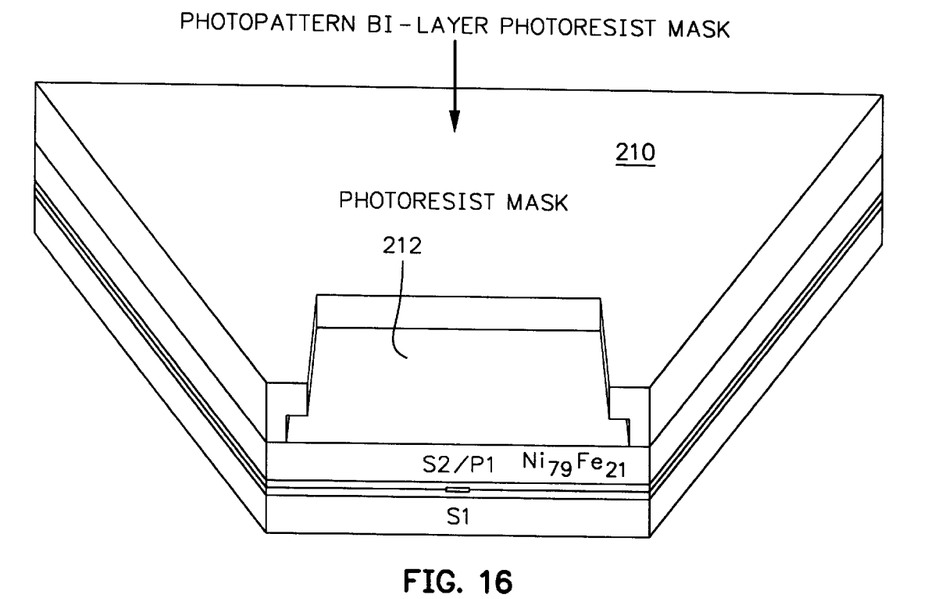
FIG. 16 is the same as FIG. 15 except a bilayer photoresist layer has been formed for the purpose of constructing the second layer of the first pole piece bilayer.

Next, in FIG. 16 a bilayer photoresist 210 is formed on the nickel iron first layer with an opening 212 exposing an area of the nickel iron first layer 204 where the iron nitride laminate second layer 206 is to be formed. It should be noted that the bilayer photoresist has an undercut which is important to the next step.

Figure 17:
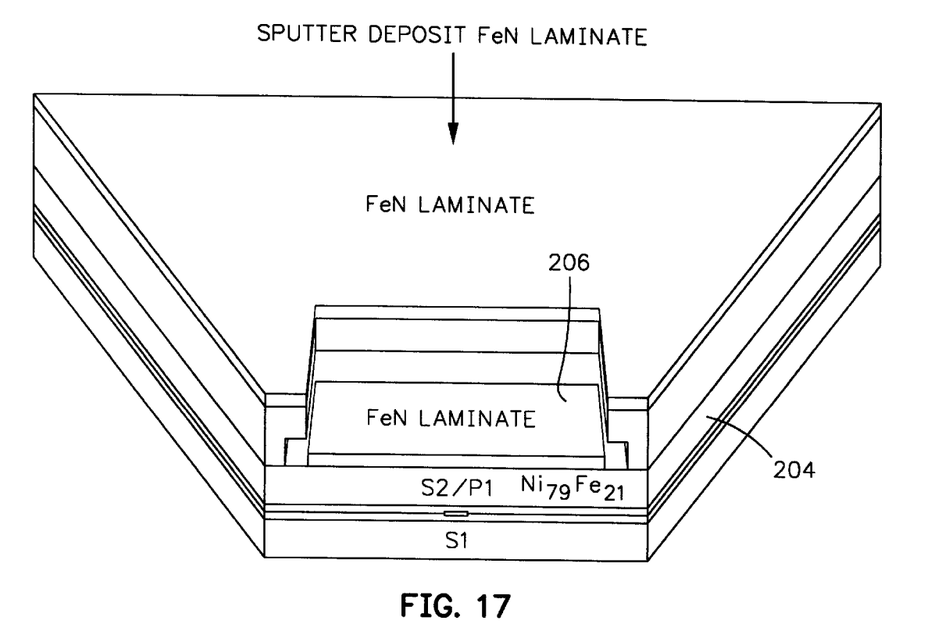
FIG. 17 is the same as FIG. 16 except the second layer has been formed.

In FIG. 17 the iron nitride laminate second layer 206 is sputter deposited over the entire wafer which forms the iron nitride laminate second layer 206 on the nickel iron first layer 204, as well as on top of the photoresist mask 210. The thickness of the iron nitride laminate second layer 206 is less than the height of the undercut of the photoresist mask, which is important to the next step.

Figure 18:
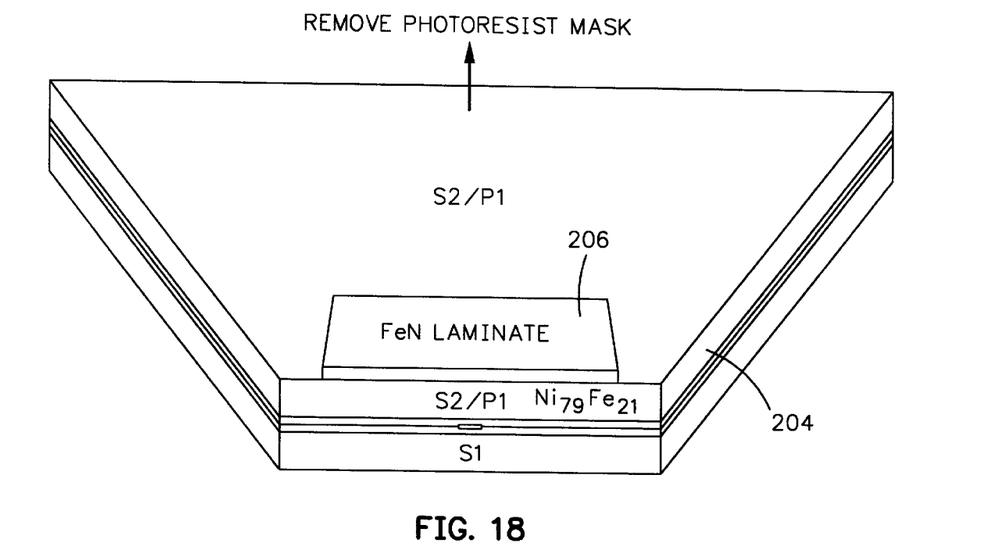
FIG. 18 is the same as FIG. 17 except the photoresist layer has been removed.

In FIG. 18 a photoresist dissolver has been placed on the wafer substrate which reaches into the undercut of the photoresist mask, as shown in FIG. 17, and dissolves the lower portion of the photoresist mask allowing it to be released from the wafer releasing the iron nitride laminate second layer 206, as shown in FIG. 18. It is important that the iron nitride laminate second layer 206 be constructed with a positive magnetostriction. This is accomplished in FIG. 17 by sputter depositing the iron nitride layers of the laminate in the presence of a predetermined amount of nitrogen. The iron nitride layers in the examples above were deposited in a Balzers Z660 sputtering system by RF magnetron from a pure Fe target. The process gas was approximately 4% nitrogen in argon.

Figure 19:
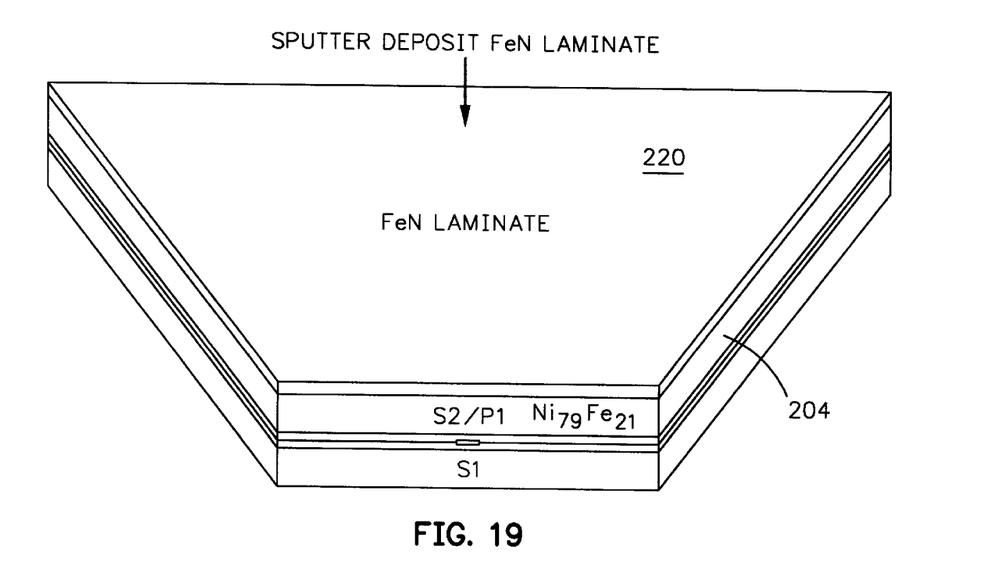
FIG. 19 is a first step in another method of constructing the bilayer first pole piece layer by forming full film first and second layers.
Figure 20:
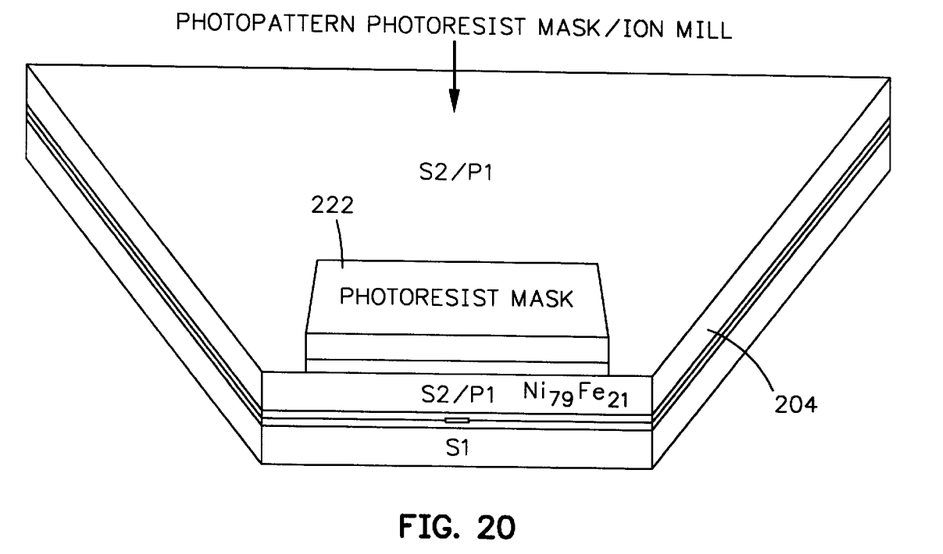
FIG. 20 is the same as FIG. 19 except a photoresist layer has been formed where a portion of the full film second layer is to be retained and ion milling is implemented to remove all portions of the second layer material except for the portion to be retained below the photoresist layer.
Figure 21:
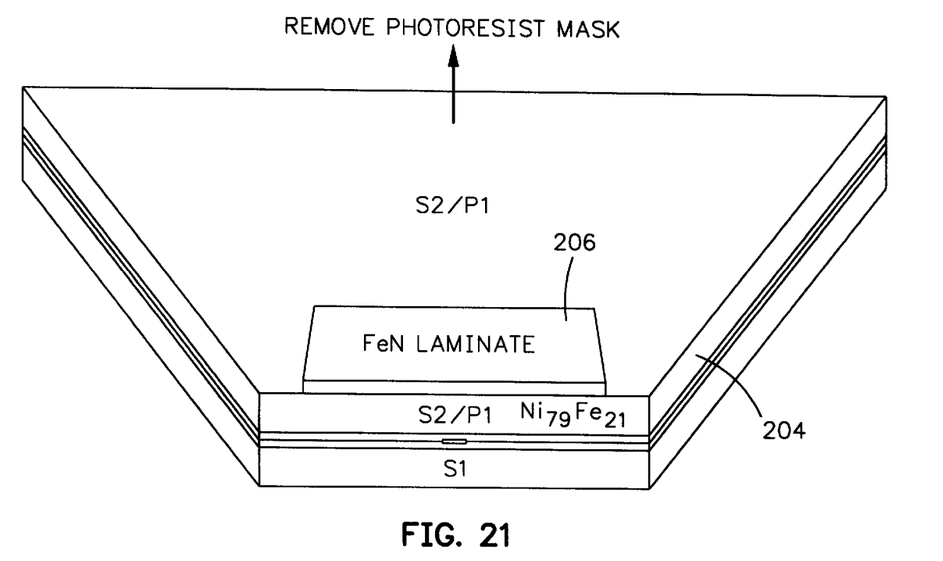
FIG. 21 is the same as FIG. 20 except the photoresist layer has been removed.

Another method of constructing the bilayer 202 is shown in FIGS. 19–21. After constructing the nickel iron first layer 204, as shown in FIG. 15, a full film of iron nitride laminate second layer 220 is deposited on the nickel iron first layer 204. This sputter deposition is done in a chamber which contains sufficient nitrogen to cause the iron nitride laminate layer 220 to have a positive magnetostriction.

In FIG. 20 a photoresist layer 222 is formed on top of the iron nitride laminate layer 220 in FIG. 19 and the wafer substrate is ion milled to remove all of the nickel iron laminate layer 220, except that under the photoresist layer 222. FIG. 21 is the same as FIG. 20 except the photoresist layer has been removed leaving the patterned iron nitride laminate second layer 206.

Other sputtered FeN-based high moment materials may be substituted for FeN. For example, additions totaling up to approximately 5 atomic percent of one or more of Al, Si, Ti, Cr, Co, Ni, Cu, Ga, Ge, Y, Zr, Nb, Mo., Ru, Rh, Ir, Sr, Hf, and Ta to FeN have high moment and positive magnetostriction with properly adjusted N content. It may also be desirable to add oxygen in combination with or instead of nitrogen to the high moment laminate layer.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A magnetic head assembly having an air bearing surface (ABS), comprising:
   a write head including:
   a ferromagnetic first pole piece bilayer having a yoke region between a pole tip region and a back gap region;
   a write gap layer on the first pole piece bilayer in the pole tip region and an insulation stack with at least one write coil embedded therein located on the first pole piece bilayer in the yoke region;
   a ferromagnetic second pole piece layer on the write gap layer and the insulation stack and magnetically connected to the first pole piece bilayer at said back gap region;
   the first pole piece bilayer including a first layer of nickel iron (NiFe) and a second layer of iron nitride (FeN) that are magnetically coupled with each other;

each of the first and second layers of the first pole piece bilayer having a magnetic moment and a volume with the first layer having a negative magnetostriction and the second layer having a positive magnetostriction; and the volume of the second layer being less than the volume of the first layer so as to cause the magnetic moment of the second layer to be pinned in a same direction as the magnetic moment of the first layer.

2. A magnetic head assembly as claimed in claim 1 including: each of the first layer and the second layer of the first pole piece bilayer having first and second surfaces that are bounded by a width at the ABS, a length that is perpendicular to the ABS and a thickness at the ABS;

each of the width, length and thickness of the second layer being less than the width, length and thickness of the first layer;

the second layer of the first pole piece bilayer being a laminate of multiple alternate iron nitride (FeN) and alumina ($Al_2O_3$) films with each film having a thickness; and the thickness of each iron nitride film with respect to each alumina ($Al_2O_3$) film having a ratio which causes the second layer to have a positive magnetostriction which substantially counterbalances the negative magnetostriction of the first layer.

3. A magnetic head assembly as claimed in claim 2 further comprising:

a read head including:
a read sensor and first and second lead layers connected to the read sensor;
nonmagnetic electrically insulative first and second read gap layers;
the read sensor being located between the first and second read gap layers;
a ferromagnetic first shield layer; and
the first and second read gap layers being located between the first shield layer and the first pole piece bilayer.

4. A magnetic head assembly as claimed in claim 3 wherein:

each of the iron nitride (FeN) films is 500 Å to 1500 Å thick; and each of the alumina ($Al_2O_3$) films is 18 Å to 100 Å thick.

5. A magnetic head assembly as claimed in claim 4 wherein:

each of the iron nitride (FeN) films is substantially 1500 Å thick;

each of the alumina ($Al_2O_3$) films is substantially 18 Å thick; and each iron nitride (FeN) film and each alumina ($Al_2O_3$) film is repeated at least two times in the laminate.

6. A magnetic head assembly as claimed in claim 4 wherein:

each of the iron nitride (FeN) films is substantially 500 Å thick;

each of the alumina ($Al_2O_3$) films is substantially 25 Å thick; and each iron nitride (FeN) film and each alumina ($Al_2O_3$) film is repeated at least six times in the laminate.

7. A magnetic head comprising:

a read sensor, said read sensor being disposed between first and second shield layers;

said second shield layer including a first layer of nickel iron (NiFe) and a second layer of iron nitride (FeN) with the first layer having a negative magnetostriction and the second layer having a positive magnetostriction;

said first and second layers being magnetically coupled with each other;

the second layer being a laminate of multiple alternate iron nitride (FeN) and alumina ($Al_2O_3$) films with each film having a thickness; and the thickness of each iron nitride film with respect to each alumina ($Al_2O_3$) film having a ratio which causes the second layer to have a positive magnetostriction which substantially counterbalances the negative magnetostriction of the first layer.

8. A magnetic head as claimed in claim 7 wherein:

each of the iron nitride (FeN) films is 500 Å to 1500 Å thick; and each of the alumina ($Al_2O_3$) films is 18 Å to 100 Å thick.

9. A magnetic head as claimed in claim 8 wherein:

each of the iron nitride (FeN) films is substantially 1500 Å thick;

each of the alumina ($Al_2O_3$) films is substantially 18 Å thick; and each iron nitride (FeN) film and each alumina ($Al_2O_3$) film is repeated at least two times in the laminate.

10. A magnetic head as claimed in claim 8 wherein;

each of the iron nitride (FeN) films is substantially 500 Å thick;

each of the alumina ($Al_2O_3$) films is substantially 25 Å thick; and each iron nitride (FeN) film and each alumina ($Al_2O_3$) film is repeated at least six times in the laminate.

11. A magnetic disk drive that includes at least one slider that has an air bearing surface (ABS), the slider supporting a magnetic head assembly that has a write head and a read head, the disk drive comprising:

the write head including:
a ferromagnetic first pole piece bilayer having a yoke region between a pole tip region and a back gap region;
a write gap layer on the first pole piece bilayer in the pole tip region and an insulation stack with at least one write coil embedded therein located on the first pole piece bilayer in the yoke region;
a ferromagnetic second pole piece layer on the write gap layer and the insulation stack and magnetically connected to the first pole piece bilayer at said back gap region;
the first pole piece bilayer including a first layer of nickel iron (NiFe) and a second layer of iron nitride (FeN) that are magnetically coupled with each other;
each of the first and second layers of the first pole piece bilayer having a magnetic moment and a volume with the first layer having a negative magnetostriction and the second layer having a positive magnetostriction; and
the volume of the second layer being less than the volume of the first layer so as to cause the magnetic moment of the second layer to be pinned in a same direction as the magnetic moment of the first layer; and the read head including:
a read sensor and first and second lead layers connected to the read sensor;
nonmagnetic electrically insulative first and second read gap layers;

the read sensor being located between the first and second read gap layers;
a ferromagnetic first shield layer; and
the first and second read gap layers being located between the first shield layer and the first pole piece bilayer; and
a housing;
a magnetic disk rotatably supported in the housing;
a support mounted in the housing for supporting the magnetic head assembly with its ABS facing the magnetic disk so that the magnetic head assembly is in a transducing relationship with the magnetic disk;
means for rotating the magnetic disk;
positioning means connected to the support for moving the magnetic head assembly to multiple positions with respect to said magnetic disk; and
processing means, that is connected to the means for rotating the magnetic disk, the positioning means and the magnetic head assembly for rotating the magnetic disk, exchanging signals with the magnetic head assembly and positioning the magnetic head assembly relative to the rotating magnetic disk.

12. A magnetic disk drive as claimed in claim 11 including:
each of the first layer and the second layer of the first pole piece bilayer having first and second surfaces that are bounded by a width at the ABS, a length that is perpendicular to the ABS and a thickness at the ABS;
each of the width, length and thickness of the second layer being less than the width, length and thickness of the first layer;
the second layer of the first pole piece bilayer being a laminate of multiple alternate iron nitride (FeN) and alumina ($Al_2O_3$) films with each film having a thickness; and
the thickness of each iron nitride film with respect to each alumina ($Al_2O_3$) film having a ratio which causes the second layer to have a positive magnetostriction which substantially counterbalances the negative magnetostriction of the first layer.

13. A magnetic disk drive as claimed in claim 12 wherein:
each of the iron nitride (FeN) films is 500 Å to 1500 Å thick; and
each of the alumina ($Al_2O_3$) films is 18 Å to 100 Å thick.

14. A magnetic disk drive as claimed in claim 13 wherein:
each of the iron nitride (FeN) films is substantially 1500 Å thick;
each of the alumina ($Al_2O_3$) films is substantially 18 Å thick; and
each iron nitride (FeN) film and each alumina ($Al_2O_3$) film is repeated at least two times in the laminate.

15. A magnetic disk drive as claimed in claim 13 wherein:
each of the iron nitride (FeN) films is substantially 500 Å thick;
each of the alumina ($Al_2O_3$) films is substantially 25 Å thick; and
each iron nitride (FeN) film and each alumina ($Al_2O_3$) film is repeated at least six times in the laminate.

16. A method of making a magnetic head assembly having a read head and a write head and an air bearing surface (ABS) comprising:
a making of the read head including:
forming a ferromagnetic first shield layer;
forming a nonmagnetic electrically insulative first read gap layer on the first shield layer;
forming a read sensor and first and second lead layers connected to the read sensor on the first read gap layer; and
forming a nonmagnetic electrically insulative second read gap layer on the read sensor and the first and second lead layers; and a making of the write head including:
forming a ferromagnetic first pole piece bilayer on the second read gap layer having a yoke region between a pole tip region and a back gap region wherein the first pole piece bilayer has a first layer of nickel iron (NiFe) and a second layer of iron nitride (FeN) which are magnetically coupled with each other and wherein each of the first and second layers has a magnetic moment and a volume wherein the volume of the second layer is less than the volume of the first layer so as to cause the magnetic moment of the second layer to be pinned in a same direction as the magnetic moment of the first layer and wherein the first layer has a negative magnetostriction and the second layer has a positive magnetostriction;
forming a write gap layer on the first pole piece bilayer in the pole tip region and an insulation stack with at least one write coil embedded located therein on the first pole piece bilayer in the yoke region; and
forming a ferromagnetic second pole piece layer on the write gap layer and the insulation stack and magnetically connected to the first pole piece bilayer at said back gap region.

17. A method as claimed in claim 16 including:
forming each of the first layer and the second layer of the first pole piece bilayer with first and second surfaces that are bounded by a width at the ABS, a length that is perpendicular to the ABS and a thickness at the ABS wherein each of the width, length and thickness of the second layer are less than the width, length and thickness of the first layer;
forming the second layer of the first pole piece bilayer as a laminate of multiple alternate iron nitride (FeN) and alumina ($Al_2O_3$) films with each film having a thickness; and
forming the thickness of each iron nitride film with respect to each alumina ($Al_2O_3$) film with a ratio which causes the second layer to have a positive magnetostriction which substantially counterbalances the negative magnetostriction of the first layer.

18. A method as claimed in claim 17 wherein:
each of the iron nitride (FeN) films is formed 500 Å to 1500 Å thick; and
each of the alumina ($Al_2O_3$) films is formed 18 Å to 100 Å thick.

19. A method as claimed in claim 18 wherein:
each of the iron nitride (FeN) films is formed substantially 1500 Å thick;
each of the alumina ($Al_2O_3$) films is formed substantially 18 Å thick; and
each iron nitride (FeN) film and each alumina ($Al_2O_3$) film is formed repeatedly at least two times in the laminate.

20. A method as claimed in claim 18 wherein:
each of the iron nitride (FeN) films is formed substantially 500 Å thick;
each of the alumina ($Al_2O_3$) films is formed substantially 25 Å thick; and
each iron nitride (FeN) film and each alumina ($Al_2O_3$) film is formed repeatedly at least six times in the laminate.

* * * * *